(12) United States Patent
Hooks

(10) Patent No.: US 8,798,820 B2
(45) Date of Patent: Aug. 5, 2014

(54) CONSISTENT LOCALIZER CAPTURES

(75) Inventor: Andrew Robert Hooks, Seattle, WA (US)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 13/227,911

(22) Filed: Sep. 8, 2011

(65) Prior Publication Data

US 2013/0066489 A1   Mar. 14, 2013

(51) Int. Cl.
 *G06F 19/00*   (2011.01)
 *G08G 5/02*   (2006.01)
(52) U.S. Cl.
 CPC ................... *G08G 5/025* (2013.01)
 USPC ........................................ 701/17
(58) Field of Classification Search
 CPC .................................... G08G 5/025
 USPC ........................................ 701/17
 See application file for complete search history.

(56) References Cited

U.S. PATENT DOCUMENTS

| | | | | |
|---|---|---|---|---|
| 3,345,017 | A | * | 10/1967 | Olah .............................. 244/185 |
| 3,781,891 | A | * | 12/1973 | Moose .......................... 342/411 |
| 4,249,158 | A | * | 2/1981 | Basov et al. .................. 340/953 |
| 4,259,658 | A | * | 3/1981 | Basov et al. .................. 340/951 |
| 4,368,517 | A | * | 1/1983 | Lovering ........................ 701/16 |
| 4,534,000 | A | * | 8/1985 | Bliss .............................. 701/16 |
| 6,438,469 | B1 | * | 8/2002 | Dwyer et al. .................. 701/16 |
| 6,604,044 | B1 | * | 8/2003 | Kirk ............................. 701/120 |
| 6,952,632 | B2 | * | 10/2005 | Robert et al. .................. 701/16 |
| 7,522,977 | B2 | * | 4/2009 | Foucart et al. ................. 701/16 |
| 7,941,251 | B2 | | 5/2011 | Krogh et al. |
| 2005/0033489 | A1 | * | 2/2005 | Tezuka ........................... 701/16 |
| 2007/0129855 | A1 | * | 6/2007 | Coulmeau ........................ 701/3 |
| 2008/0294307 | A1 | * | 11/2008 | Krogh ............................. 701/7 |
| 2009/0153363 | A1 | * | 6/2009 | Lapp ............................ 340/973 |
| 2010/0256841 | A1 | * | 10/2010 | Garrec et al. ................. 701/17 |

\* cited by examiner

*Primary Examiner* — Behrang Badii
*Assistant Examiner* — Daniel L Greene
(74) *Attorney, Agent, or Firm* — Hope Baldauff, LLC

(57) ABSTRACT

Systems and methods for accurately converting angular localizer data into rectilinear localizer data thereby allowing for improved localizer capture performance and stability. The systems and methods utilize information onboard an aircraft regarding the aircraft's current position and the destination runway's position to more accurately determine a distance measurement for converting angular deviations into rectilinear deviations.

20 Claims, 3 Drawing Sheets

CONSISTENT LOCALIZER CAPTURES

BACKGROUND

Instrument Landing System ("ILS") is a system supporting high precision guidance to an aircraft approaching and landing on a runway. The ILS typically includes transmitters and antenna arrays on the ground, receivers and antennas on the aircraft, and a display on the aircraft for the flight crew. Autopilots and/or flight directors may also be used on the aircraft.

The portion of the ILS that provides lateral guidance is referred to as the localizer. Vertical guidance is provided via a glideslope portion. The localizer and glideslope portions provide an aircraft with an indication of its separation from a desired approach path, in the form of an angular error referred to as an angular ILS deviation.

An aircraft preparing to perform a landing approach must fly a flight path that intersects the localizer. As the aircraft nears the desired approach path (i.e., the null of the localizer), it executes a turn to capture the null. This turn is typically executed in response to a steering input provided by a pilot following raw deviations on a display, in response to a steering input provided by a pilot following guidance received from a flight director system, or an autopilot system following guidance provided by the ILS. After a successful capture maneuver, the aircraft's flight path will be in line with the runway centerline. Ideally, the aircraft will perform a single turn to capture the localizer null, and will not fly through the null (overshoot) prior to completing its turn. The inherently angular nature of ILS deviations provides challenges when attempting to perform consistent localizer captures at varying distances from an ILS localizer transmitter.

On aircraft equipped with flight director and/or autopilot systems, converting the angular ILS deviation into a rectilinear ILS deviation is beneficial such that consistent localizer capture guidance can be provided regardless of distance from the ILS localizer transmitter. On some aircraft, the distance estimate that is used for converting angular ILS deviations to rectilinear ILS deviations is prone to error. The distance estimate is typically formed using radio altitude and glideslope error. Terrain effects, varying runway lengths, unusual glideslope angles, or localizer captures attempted prior to receiving valid radio altitude and/or glideslope deviations can result in an inaccurate distance estimate. This inaccurate distance estimate can, in turn, provide inaccurate localizer deviation and deviation rate data to the localizer control laws, and result in degraded localizer capture performance characterized by undesirable roll and/or yaw attitude profiles along with additional overshoot during the capture maneuver.

Moreover, the erroneous conversion factor used to convert an angular ILS deviation to a rectilinear ILS deviation manifests itself as a gain on the localizer deviation feedback loop in the control laws. This known source of inaccuracy requires control law gain reduction in the localizer deviation feedback loop, and the sacrifice of performance in favor of robustness. This known source of error also drives additional time and effort into the design and test of the control law, as the designer must show the control law is robust to a wide array of destination facility properties and approach geometries.

In practice, large localizer overshoots are common. This is primarily due to the fact that the segment of the localizer beam that reliably provides an accurate indication of aircraft displacement is relatively narrow. This segment, referred to as the course guidance sector, may be only approximately +/−2 degrees of arc about the localizer null. If an aircraft does not begin its turn until it encounters this sector, it may have a smaller physical distance than required in which to complete its turn in order to avoid an overshoot.

The propensity of an overshoot is exacerbated if the aircraft is intercepting the localizer with a large intercept angle, a high ground speed, or is close to the airfield (where the constant angular beam width corresponds to a smaller physical distance). Current aircraft systems do not begin the localizer capture maneuver until the linear part of the localizer beam is reached (i.e., the course guidance sector), and thus are prone to large overshoots.

It is with respect to these and other considerations that the disclosure made herein is presented.

SUMMARY

Concepts and technologies are described herein for consistent ILS localizer captures. In accordance with the concepts and technologies disclosed herein, a method for accurately converting angular localizer data into rectilinear localizer data is provided such that localizer deviation and deviation rate can be estimated with greater accuracy than current methods.

According to one aspect, a method for guiding an aircraft during a final approach toward a runway includes receiving a geographic position of the aircraft, a geographic position of a runway threshold of the runway, a runway length of the runway, and a runway azimuth of the runway. The method further includes computing a distance from the aircraft to the runway threshold and a bearing to the runway threshold utilizing the geographic position of the aircraft and the geographic position of the runway threshold. The method further includes projecting the distance from the aircraft to the runway threshold into an along runway component and a cross runway component utilizing the runway azimuth of the runway, and computing a distance from the aircraft to a localizer transmitter by adding the runway length to the along runway component of the projection of the distance from the aircraft to the runway threshold. The method still further includes converting an angular localizer deviation into a rectilinear localizer deviation utilizing, in part, the distance from the aircraft to the localizer transmitter.

It should be appreciated that the above-described subject matter may be implemented as a computer-controlled apparatus, a computer process, a computing system, or as an article of manufacture such as a computer-readable storage medium. In particular, the above-described subject matter may be implemented in one or more components of an avionics system. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
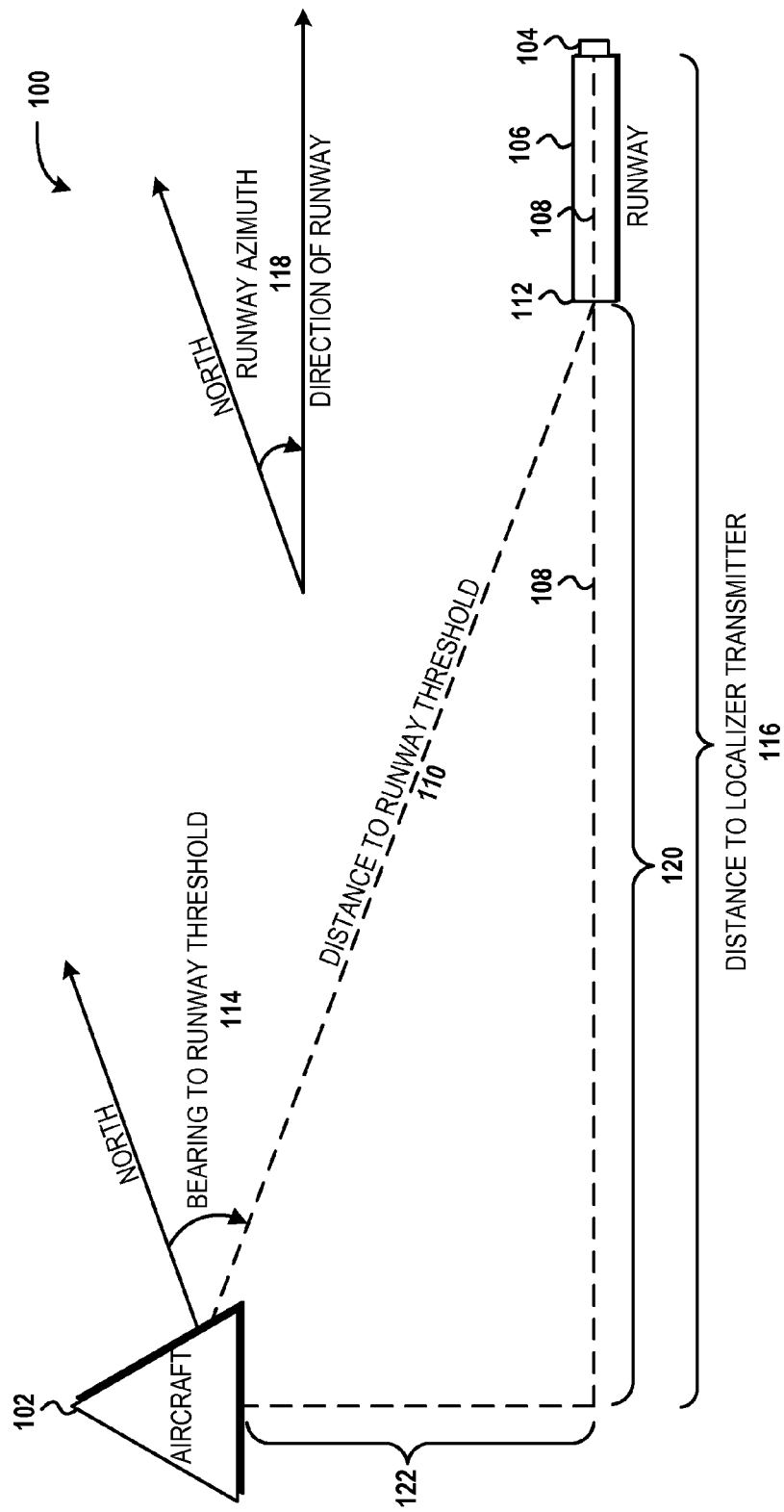
FIG. 1 is a diagram illustrating an aerial view of an exemplary method for estimating distance from an aircraft to a localizer transmitter in an along runway axis to be used in an Instrument Landing System ("ILS") localizer capture maneuver, according to an exemplary embodiment.

The following detailed description is directed to concepts and technologies for consistent localizer capture. According to the concepts and technologies described herein, information available on-board an aircraft regarding the aircraft's current position (e.g., latitude and longitude) and the destination runway's position (e.g., latitude and longitude) is utilized to determine a more accurate distance measurement for use in conversions of Instrument Landing System ("ILS") deviations from inherently angular deviations to rectilinear deviations, thus improving localizer capture performance and stability. Prior to describing the accompanying drawings, several key details of current ILSs will be described to aid in distinguishing the novel concepts and technologies presented herein for consistent localizer capture.

As described above, ILS guidance is inherently angular and is only provided for a narrow region referred to as the course guidance sector in which angular offset received by an aircraft is correctly reporting the aircraft's distance from a centerline of a destination runway. The centerline of the destination runway is also referred to as the ILS localizer null. The narrow course guidance sector limits the timing during which an aircraft can initiate or capture an ILS localizer.

If the runway centerline is projected out to the intended point of localizer capture, and if the aircraft is approaching with a certain ground speed at a certain intercept angle toward a final approach course that the aircraft is trying to capture, a physical point exists at which the aircraft needs to initiate a turn in order to bank up to a certain bank angle (e.g., 30 degrees) and execute a one turn capture of the runway center line (i.e., the ILS localizer null) to obtain the final approach course without overshoot. Given the aforementioned requirements, a certain distance from the ILS localizer null exists where the aircraft needs to be located in order to initiate a proper turn to effectively (i.e., without overshoot) capture the ILS localizer null.

For a wide array of localizer captures, the course guidance sector is not wide enough to allow the aircraft to initiate a localizer capture early enough to capture the localizer null in one turn. Typically, the narrow nature of the course guidance sector restricts the aircraft from performing a one turn capture and results in an overshoot of the runway centerline during a capture attempt. This aspect was a focus of U.S. Pat. No. 7,941,251 ("the '251 patent"), which is incorporated herein by reference in its entirety.

In the '251 patent, flight management computer data is used to instruct an autopilot when to initiate a turn even if the aircraft is not located within the course guidance sector. This instruction to start turning in the correct direction is not based upon ILS guidance, but is based upon final approach course deviation data and utilizes a control law in the autopilot that turns the aircraft in the proper direction until the aircraft intercepts and enters the course guidance sector, at which point ILS guidance data is used to complete the capture.

In some previous solutions for localizer captures, an autopilot of an aircraft receives localizer deviations in the form of an angular separation from a localizer null. This angular deviation is converted to a rectilinear deviation through the use of an estimated distance to a localizer transmitter. The control algorithms and localizer mode engage logic used for autopilot and flight director both utilize this calculated rectilinear deviation.

The conversion of the localizer deviation into a rectilinear distance is currently performed in two stages. The first stage includes a conversion from difference in the depth of modulation ("DDM") to degrees (or radians). The International Civil Aviation Organization ("ICAO") specifies that the ILS localizer beam sensitivity shall be 0.00044 DDM/ft at the runway threshold. Based upon this specification, some aircraft (e.g., Boeing widebody airplanes), currently assume a standard runway length and can therefore apply a constant conversion factor to convert the deviation in DDM to a deviation in degrees (or radians). This conversion can be in error at any facility where the actual runway length does not match the assumed runway length used to arrive at the conversion constant.

The second stage of localizer deviation conversion includes a conversion from degrees (or radians) to feet (or some other linear unit of distance) utilizing radio altitude and glideslope deviation data, such as are used on Boeing widebody aircraft. This approach to localizer capture relies upon several key assumptions:

1) The terrain at an aircraft's current location is at the same elevation as the destination runway.
2) The glideslope transmitter is an assumed distance beyond the runway threshold.
3) The localizer transmitter is an assumed distance beyond the runway threshold.
4) The glideslope beam null is 3 degrees.
5) Valid and accurate radio altimeter and glideslope deviation data are available at the time of localizer capture.

If any of the aforementioned assumptions are not satisfied during a localizer capture, the localizer deviation and the deviation rate provided to the control laws will be in error. The vast majority of the time at least one of these assumptions is not satisfied. Thus, the capture logic and the control law algorithm for capturing and tracking the localizer null must be robust to account for significant errors in the location deviation and deviation rate.

In other previous solutions, an autopilot of an aircraft utilizes angular ILS deviations directly without a conversion to rectilinear. These designs have their own performance issues, which are outside the scope of the disclosure made herein.

The concepts and technologies presented herein for consistent localizer capture also aid in mitigating the aforementioned issues and, more fundamentally, aid with the tracking and capture of the ILS localizer once the aircraft has entered the course guidance sector. The tracking and capture of the ILS localizer has historically been poor based upon the lack of an accurate way to convert an inherently angular ILS deviation into a rectilinear ILS deviation. Moreover, even when the aircraft is in the course guidance sector and the angular ILS deviation is accurate, it is beneficial to convert the angular ILS deviation into a rectilinear ILS deviation in order to provide a consistent capture performance that is decoupled from the aircraft's distance to the destination runway threshold.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for consistent ILS localizer captures will be presented.

Turning now to FIG. 1, an aerial view 100 illustrating a method for estimating distance from an aircraft 102 to an ILS localizer transmitter 104 located at a destination runway 106 for use in ILS localizer capture maneuvers will be described, according to an exemplary embodiment. In some embodiments, the ILS localizer transmitter 104 is part of a ground component of the localizer portion of an ILS that includes one or more transmitters and one or more antenna arrays (not shown) for transmitting guidance signals to the aircraft 102. The ILS localizer transmitter 104 emanates a course guidance sector, which includes an ILS localizer null 108 extending from the ILS localizer transmitter 104 along the centerline of the destination runway 106 and beyond. The course guidance sector provides a small trusted region in which angular deviation received by the aircraft 102 is correctly reporting the aircraft's 102 distance from the centerline of the destination runway 106.

Typically, the course guidance sector may be visualized as an area defined by an arc emanating from the ILS localizer transmitter 104 and enclosed by ILS localizer boundaries extending therefrom. For ease of illustration and so as not to obscure various aspects of the disclosed method, the ILS course guidance sector and the ILS localizer boundaries are not illustrated. The illustrated method is focused on tracking and capturing the ILS localizer null 108 during a capture maneuver executed within the course guidance sector. It should be understood, however, that aspects of the illustrated method may be applicable to tracking and capturing the ILS localizer null 108 during a capture maneuver initiated outside of the course guidance sector for a given scenario.

The aerial view 100 also illustrates a distance 110 to a runway threshold 112 that is calculated utilizing an algorithm of a flight management function ("FMF") of the aircraft 102, as will be described in greater detail below. This calculation is based upon the geographic position (e.g., in terms of latitude and longitude) of the aircraft 102 and the geographic position (e.g., in terms of latitude and longitude) of the runway threshold 112 as obtained via a navigation system of the aircraft 102, as will also be described in greater detail below. A bearing 114 to the runway threshold 112 is also calculated utilizing an algorithm of the FMF.

In some embodiments, in order to calculate a distance 116 from the aircraft 102 to the ILS localizer transmitter 104, a runway length (not shown) and a runway azimuth 118 are needed. In some embodiments, the actual runway length and the runway azimuth 118 are also be obtained from a navigation system of the aircraft 102. If a runway length for the runway 106 is not available, in some embodiments, a standard runway length or an estimated runway length can be used. In some embodiments, the runway azimuth 118 may also be estimated. Estimations of the runway azimuth 118 and/or the runway length may result in decreased accuracy of the distance 116 from the aircraft 102 to the ILS localizer transmitter 104, but may, in certain scenarios, be beneficial or of greater accuracy than estimates determined using previous methodologies.

Utilizing the distance 110 to the runway threshold 112, the bearing 114 to the runway threshold 112, the runway azimuth 118, and the runway length, the distance 116 from the aircraft 102 to the ILS localizer transmitter 104 is calculated according to the below equation:

$$dist\_to\_loc = dist\_to\_rwy\_thd * cos(brg\_to\_thd - rwy\_azmth) + rwy\_len.$$

In the above equation, dist_to_loc is the distance 116, dist_to_rwy_thd is the distance 110, brg_to_thd is the bearing 114, rwy_azmth is the runway azimuth 118, and rwy_len is the runway length. Moreover, in the above equation, the product of the distance 110 and the cosine of the difference between the bearing 114 and the runway azimuth 118 provides an along runway distance component 120 of the distance 110 in the along runway axis.

In some embodiments, a cross runway distance component 122 of the distance 110 is calculated. Moreover, in some embodiments, the cross runway distance component 122 is utilized as a trigger, in accordance with embodiments disclosed in the '251 patent, for initiating a capture maneuver outside of a course guidance sector.

The above-described method for computing the distance 116 from the aircraft 102 to the ILS localizer transmitter 104 in the along runway axis creates an accurate distance estimate that does not rely on any of the aforementioned assumptions that are currently used, and that often cause distance estimates from an aircraft to an ILS localizer transmitter to be grossly in error. Moreover, although this method injects an opportunity for error in the form of an unknown distance between the far end of the destination runway 106 and the actual location of the ILS localizer transmitter 104, this error is negligible as compared to the errors introduced by relying upon the aforementioned assumptions for calculating such distances.

In some embodiments, the aforementioned error in the form of an unknown distance between the far end of the destination runway 106 and the actual location of the ILS localizer transmitter 104 is eliminated by storing the geographic position of the ILS localizer transmitter 104 in the navigation database of the aircraft 102. In these embodiments, the need for a runway length value and an assumption regarding the distance between the end of the destination runway 106 and the ILS localizer transmitter 104 is negated. Moreover, in these embodiments, a distance from the runway threshold 112 to the localizer transmitter 104 is computed utilizing the respective geographic positions of the runway threshold 112 and the localizer transmitter 104. The distance from the runway threshold 112 to the localizer transmitter 104 then replaces the rwy_len in the above equation, as shown in the below modified equation:

$$dist\_to\_loc = dist\_to\_rwy\_thd * cos(brg\_to\_thd - rwy\_azmth) + dist\_from\_rwy\_thd\_loc$$

In some embodiments, this method is used for front course ILS localizer approaches that are coupled with an ILS glideslope, or for ILS Backcourse ("BCRS") approaches. Current methods, however, can perform particularly poorly when no glideslope or glidepath reference is available, such as is often the case for BCRS approaches.

Utilizing the distance 116 from the aircraft 102 to the ILS localizer transmitter 104 calculated according to the above-described methods, an accurate conversion of angular ILS deviations to rectilinear ILS deviations can be made. This enables modifications to existing localizer capture logic and control laws to mitigate performance problems that plague ILS localizer captures today.

In some embodiments, the aircraft 102 is a commercial passenger aircraft including, for example, the 737, 747, 757, 767, 777, 787 models commercially-available from The Boeing Company of Chicago, Ill. The concepts and technologies disclosed herein may also be applied for use in, manufacture of, and/or assembly of other aircraft including, but not limited to, other commercial aircraft, civilian aircraft, military aircraft, passenger aircraft, cargo aircraft, fixed wing aircraft, rotary aircraft, hybrid fixed wing and rotary aircraft, unmanned aircraft, and manned aircraft.

Figure 2:
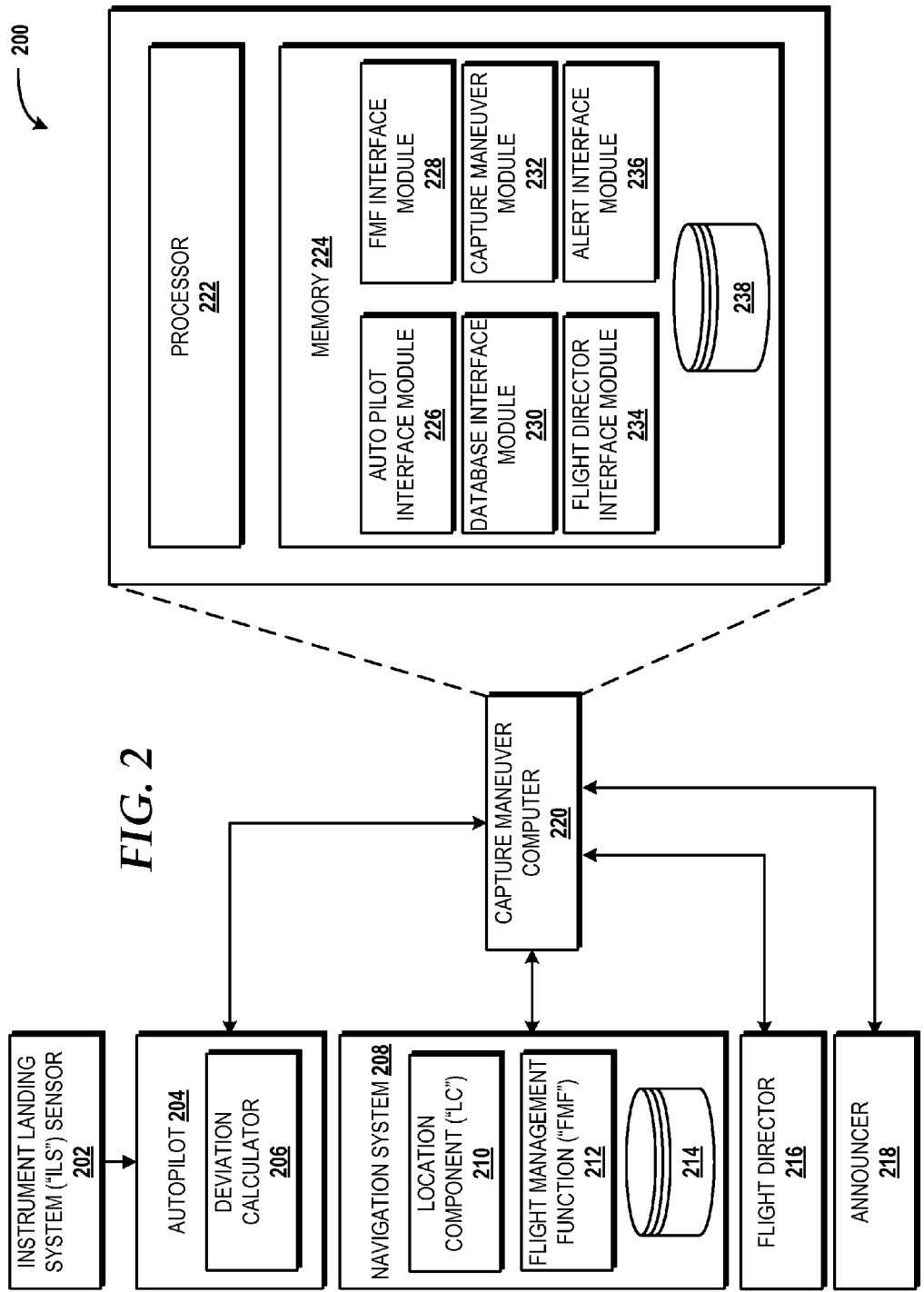
FIG. 2 is a block diagram illustrating an avionics system in which methods for performing localizer captures may be implemented, according to an exemplary embodiment.

Turning now to FIG. 2, a system diagram illustrating an exemplary avionics system 200 of an aircraft in which methods for estimating a distance from the aircraft to an ILS localizer transmitter located at a destination runway for use in ILS capture maneuvers will be described, according to an exemplary embodiment. To aid in facilitating the following description, the avionics system 200 is described with further reference to FIG. 1. In particular, the avionics system 200 is described as being included in the aircraft 102 executing a landing approach towards the destination runway 106.

The avionics system 200 includes an ILS sensor 202, an autopilot 204 that includes a deviation calculator 206, a navigation system 208 that includes a location component ("LC") 210, a flight management function ("FMF") 212 and a navigation database 214, a flight director 216, an announcer 218, and a capture maneuver computer 220. In some embodiments, methods for performing localizer capture maneuvers may be implemented in the capture maneuver computer 220.

The ILS sensor 202 is configured to receive guidance signals from one or more ILS localizer transmitters, such as the ILS localizer transmitter 104, via one or more receivers. For each landing approach of the aircraft 102, the ILS sensor 202 processes received guidance signals and acquires one or more angular separations of the aircraft 102 from the ILS localizer null 108 (FIG. 1).

The autopilot 204 is configured to receive an ILS localizer null that the pilot of the aircraft 102 wants to capture, and to capture that ILS localizer null without further human intervention. In some embodiments, the autopilot 204 is configured to utilize the above equation to calculate the distance 116 to the ILS localizer transmitter 104. In some embodiments, the autopilot 204 is configured to receive angular ILS deviations during the landing approach of the aircraft 102 towards the destination runway 106. In some embodiments, the deviation calculator 206 converts the angular ILS deviations to rectilinear ILS deviations utilizing, in part, the distance 116 to the ILS localizer transmitter 104 calculated by the autopilot 204 in accordance with the above equation.

In some embodiments, the deviation calculator 206 is implemented as one or more software algorithms embodied within computer-executable instructions that are executable by the autopilot 204. In other embodiments, the deviation calculator 206 is implemented in a similar manner in one or more other avionic components that are capable of receiving, processing, and storing data.

The navigation system 208 is used to provide, in various combinations according to various embodiments described above, the geographic position (e.g., latitude and longitude) of the aircraft 102 during flight, the geographic position of the runway threshold 112, the runway azimuth 118, the runway length, and the actual location of the ILS localizer transmitter 104. The geographic position of the aircraft 102 may be provided utilizing the LC 210 embodied as an Inertial Reference System ("IRS"), an Attitude Heading and Reference System ("AHRS"), a Global Positioning System ("GPS"), some combination thereof, or the like. The geographic position of the runway threshold 112, the runway azimuth 118, the runway length, and the actual location of the ILS localizer transmitter 104 are stored in the navigation database 214 in some combination, in accordance with the various embodiments described above. This information may be updated as needed for a particular destination.

The navigation system 208 is also equipped with the FMF 212. The FMF 212 includes one or more algorithms that are used to calculate the distance 110 to the runway threshold 112 and the bearing 114 to the runway threshold 112, as described above.

The flight director 216 is configured to compute and display the proper path for the aircraft 102 to one or more pilots during a specific flight. In some embodiments, the flight director 216 includes a flight director indicator ("FDI"), a horizontal situation indicator ("HIS"), a mode selector, and/or a flight director computer (all not shown). Moreover, in some embodiments, the FDI includes a display for presenting one or more symbols, indicators, or other information including, an attitude indicator, a fixed aircraft symbol, pitch and bank command bars, a glide slope indicator, a localizer deviation indicator, and/or the like. In some embodiments, the flight director 216 provides a pilot with steering commands necessary to obtain and hold a desired course. These steering commands may be, for example, those necessary to perform capture maneuvers. In some embodiments, the flight director 216 provides steering commands that account for a rectilinear ILS deviation calculated by the autopilot.

The announcer 218, in some embodiments, includes one or more of a speaker, a buzzer, or other type of warning or noise-generating device. The announcer 218 may be activated by the exemplary avionics system 200 to provide audio warnings and messages to a flight crew. In some embodiments, the announcer 218 is activated by the capture maneuver computer 220.

The autopilot 204, the navigation system 208, the flight director 216, and the announcer 218 are each configured to communicate with the capture maneuver computer 220. Although exemplary directions of communication between these components of the avionics system 200 are illustrated, such directions are not intended to be limiting in any way. Moreover, the various components of the avionics system 200 may communicate with one another for various purposes should the need arise for a particular implementation.

As further shown in FIG. 2, the capture maneuver computer 220 has processing capabilities and memory suitable to store and execute computer-executable instructions. In the illustrated embodiment, the capture maneuver computer 220 includes one or more processors 222 and a memory 224. The memory 224 may include volatile and nonvolatile memory, removable and non-removable media implemented in any method or technology for storage of information, such as computer-readable instructions, data structures, program modules or other data. Such memory includes, but is not limited to, random access memory ("RAM"), read-only memory ("ROM"), electrically erasable programmable read-only memory ("EEPROM"), flash memory or other memory technology, compact disc, read-only memory ("CD-ROM"), digital versatile disks ("DVD") or other optical storage, magnetic cassettes, magnetic tape, magnetic disk storage or other magnetic storage devices, redundant array of independent disks ("RAID") storage systems, or any other medium which can be used to store the desired information and which can be accessed by a computer system.

Software program modules which enable the capture maneuver computer 220 to perform various functions may be stored in the memory 224. In the illustrated embodiment, the memory 224 includes an autopilot interface module 226, a flight management function interface module 228, a database interface module 230, a capture maneuver module 232, a flight director interface module 234, an alert interface module 236, and a capture maneuver computer database 238. These modules may be implemented as computer-executable instructions that are executed by the one or more processors 222 to perform the functions described below.

The autopilot interface module 226 is configured to communicate with the autopilot 204. The communication may be established over an electrical connection, an optical connection, and/or the like. In some embodiments, the autopilot interface module 226 is configured to receive one or more angular deviations, or alternatively, estimated rectilinear deviations, from the autopilot 204. As described above, the estimated rectilinear deviations are calculated from the angular deviations received by the autopilot 204. In some embodiments, the autopilot interface module 226 is also configured to enable the autopilot 204 to perform capture maneuvers under the direction of the capture maneuver computer 220, as described below.

The FMF interface module 228 is configured to communicate with the FMF 212 of the navigation system 208. The communication may be established over an electrical connection, an optical connection, and/or the like. In some embodiments, the FMF interface module 228 is configured to receive the calculated FAC deviations from the FMF 212.

The database interface module 230 enables the reading of data from and writing of data to the capture maneuver computer database 238. In some embodiments, the database interface module 230 is activated by one or more of the other modules illustrated in the memory 224, as further described below. In some embodiments, the capture maneuver computer database 238 contains data that may be necessary to initiate a standard capture maneuver based on ground track angle, ground speed, and runway heading.

In some embodiments, the capture maneuver module 232 is configured to command the autopilot 204 to automatically perform localizer capture maneuvers. Alternatively, in other embodiments, the capture maneuver module 232 is configured to provide information to the flight director 216. This information may enable a pilot to manually perform localizer capture maneuvers.

The flight director interface module 234 facilitates the communication between the flight director 216 and the capture maneuver module 232. For example, the flight director interface module 234 may enable the flight director 216 to provide a pilot with the necessary steering commands to complete a capture maneuver.

The alert interface module 236, in some embodiments, is directed by the capture maneuver module 232 to cause the announcer 218 to alert a flight crew that a particular flight mode is active. In some embodiments, the alert interface module 236 causes the announcer 218 to inform the flight crew of the initialization and the termination of a particular flight mode. In some embodiments, the alert interface module 236 causes the announcer 218 to be activated for the duration that the particular flight mode is active. The alert interface module 236 activates the announcer 218 to convey information by representative tones, human speech, and/or computer speech.

In some embodiments, the capture maneuver computer 220 uses the alert interface module 236 to cause one or more cockpit displays (not shown) to visually indicate that a particular flight mode is active. For example, in one implementation, a primary flight display ("PFD") is activated by the capture maneuver computer 220 to present symbols and/or characters during the activation of the particular flight mode. In another implementation, one or more push button lights on the mode control panel ("MCP") are illuminated during the particular flight mode activation to provide visual alert.

It should be appreciated that the illustrated avionics system 200 is only one example of a suitable operating environment and is not intended to suggest any limitation as to the scope of use or functionality of the invention defined by the appended claims. Other avionic environments and/or configurations may be suitable for use with the concepts and technologies disclosed herein. For example, the exemplary capture maneuver computer 220 may be provided as a part of a flight management computer ("FMC"). In other exemplary examples, one or more of the modules 226-236 is directly implemented on the FMC, the autopilot 204, or any other suitable avionic component of a flight management system ("FMS"), navigation system, or any avionic system present in an aircraft that is capable of receiving, processing, and storing data.

Encoding the software program modules presented herein may transform the physical structure of the computer-readable media, such as the memory 224, presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the avionics system 200 in order to store and execute the software components presented herein. It also should be appreciated that the avionics system 200 may include other types of computing devices, including hand-held computers, embedded computer systems, personal digital assistants, and other types of computing devices known to those skilled in the art. It is also contemplated that the avionics system 200 may not include all of the components shown in FIG. 2, may include other components that are not explicitly shown in FIG. 2, or may utilize an architecture completely different than that shown in FIG. 2.

Figure 3:
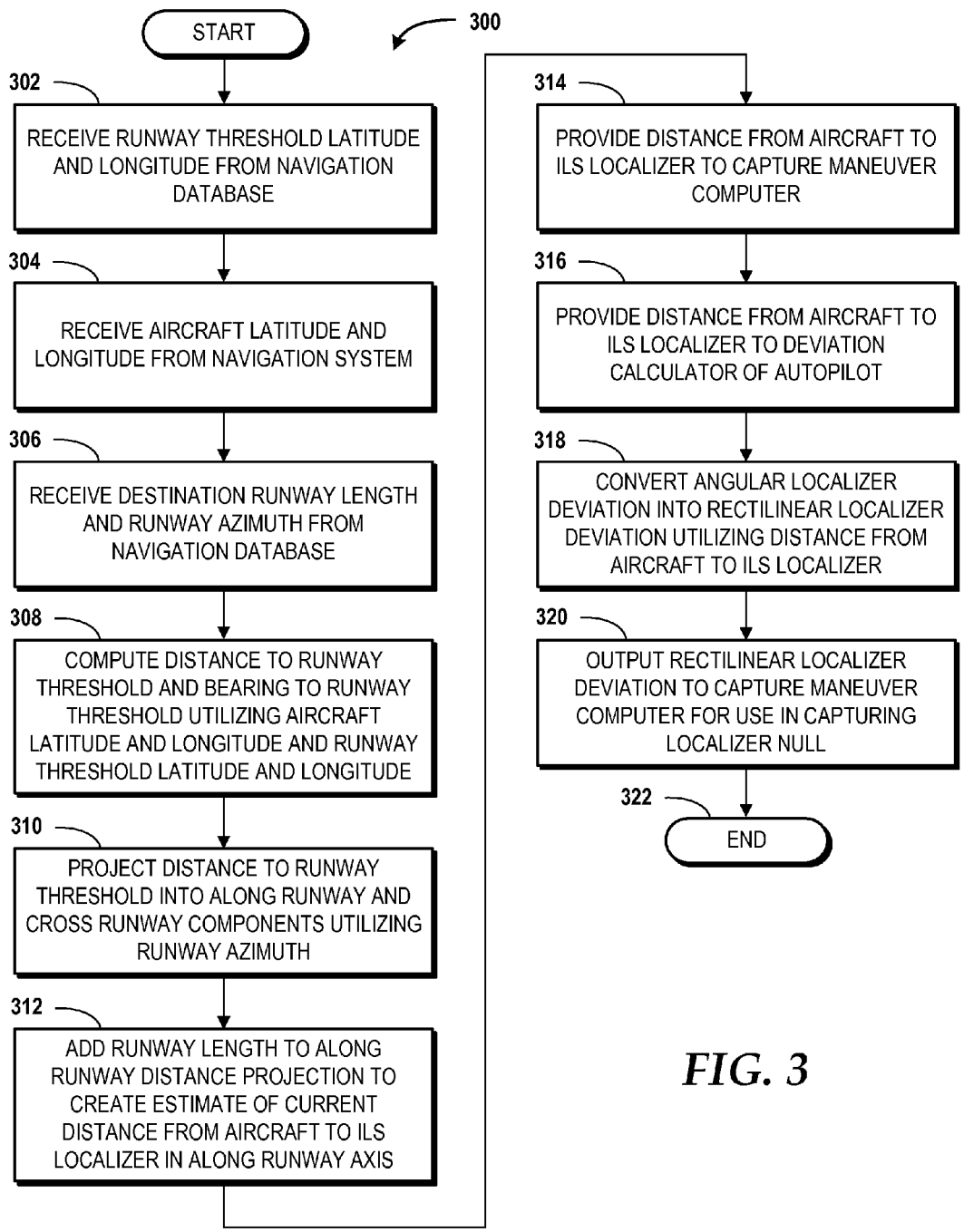
FIG. 3 is a flow diagram illustrated various aspects of a method for estimating distance from an aircraft to a localizer transmitter in an along runway axis to be used in an ILS localizer capture maneuver, according to an exemplary embodiment.

Turning now to FIG. 3, aspects of a method 300 for estimating a distance from an aircraft to an ILS localizer transmitter will be described in detail, according to an exemplary embodiment. To aid in facilitating the following description, the method 300 is described with further reference to FIGS. 1 and 2.

It should be understood that the operations of the method 300 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the method 300, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts and technologies disclosed herein, the method 300 disclosed herein is described as being performed by the avionics system 200 or some portion thereof. It should be understood that the avionics system 200, the components thereof, as well as additional and/or alternative systems, devices, or components thereof, can provide the functionality described herein via execution of one or more application programs including, but not limited to, application programs embodied at least in part by the program modules, calculators, and/or functions described above. Furthermore, it should be understood that the functionality of the avionics system 200 can be provided by any number of systems or devices, and is not limited to the avionics system 200 illustrated in FIG. 2. Thus, the illustrated embodiment is exemplary, and should not be viewed as being limiting in any way.

The method 300 begins at operation 302, wherein the FMF 212 receives the geographic position (e.g., latitude, longitude) of the runway threshold 112 from the navigation database 214. From operation 302, the method 300 proceeds to operation 304, wherein the FMF 212 receives the geographic position (e.g., latitude, longitude) of the aircraft 102 from the navigation system 208. In some embodiments, the geographic position of the aircraft 102 is acquired via the LC 210 and then stored at least temporarily in the navigation database 214. Alternatively, in some embodiments, the geographic position of the aircraft 102 is received directly from the LC 210, thus bypassing the at least temporary storage in the navigation database 214.

From operation 304, the method 300 proceeds to operation 306, wherein the capture maneuver computer 220 receives a length of the destination runway 106 and the runway azimuth 118 from the navigation database 214. As disclosed above, the length of the destination runway 106 may be an actual length of the destination runway 106 or a standard runway length. For example, the standard runway length may be standard to the destination airfield of which the destination runway 106 is a part, or based upon some other criteria. Moreover, in some embodiments, the need for the runway length is negated if replaced by an actual geographic position of the ILS localizer transmitter 104.

From operation 306, the method 300 proceeds to operation 308, wherein the FMF 212 computes the distance 110 to the runway threshold 112 and the bearing 114 to the runway threshold 112 utilizing the aircraft 102 latitude and longitude and the runway threshold 112 latitude and longitude received from the navigation system 208.

From operation 308, the method 300 proceeds to operation 310, wherein the FMF 212 projects the distance 110 to the runway threshold 112 computed in operation 308 into an along runway component (e.g., the along runway distance component 120) and a cross runway component (e.g., the cross runway distance component 122) utilizing the runway azimuth 118. The product of the distance 110 and the cosine of the difference between the bearing 114 and the runway azimuth 118 provides the along runway distance component, illustrated in FIG. 1 as the projection 120 of the distance 110.

From operation 310, the method 300 proceeds to operation 312, wherein the FMF 212 adds the runway length received in operation 306 to the along runway component of the projection of the distance 110, thereby creating an accurate estimate of the distance 116 from the aircraft 102 to the ILS localizer transmitter 104. The distance 116 is thus provided by the following equation, duplicated from above:

$$\text{dist\_to\_loc} = \text{dist\_to\_rwy\_thd} * \cos(\text{brg\_to\_thd} - \text{rwy\_azmth}) + \text{rwy\_len}.$$

In the above equation, dist_to_loc is the distance 116, dist_to_rwy_thd is the distance 110, brg_to_thd is the bearing 114, rwy_azmth is the runway azimuth 118, and rwy_len is the runway length.

From operation 312, the method 300 proceeds to operation 314, wherein the FMF 112 provides the distance 116 from the aircraft 102 to the ILS localizer transmitter 104 is provided to the capture maneuver computer 220. The maneuver computer 220, at operation 316, provides the distance 116 to the autopilot 204. Alternatively, in some embodiments, the FMF 212 provides the distance 116 directly to the autopilot 204.

From operation 316, the method 300 proceeds to operation 318, wherein the deviation calculator 206 of the autopilot 204 converts one or more angular localizer deviations into one or more rectilinear localizer deviations utilizing, in part, the distance 116 created in operation 312. The autopilot 204, at operation 320, outputs the one or more rectilinear localizer deviations to the capture maneuver computer 220 for use in capturing the localizer null. For example, the capture maneuver computer 220 may then provide the one or more rectilinear deviations to the flight director 216, which then instructs the pilot to steer the aircraft 102 to capture the localizer null. Alternatively, in some embodiments, the rectilinear deviations are not output and are utilized by the autopilot 204 to aid in automatically flying the aircraft 102 to capture the localizer null and continue the landing approach towards the destination runway 106. Further communications between the capture maneuver computer 220 and the autopilot 204 may be used to implement these embodiments.

From operation 320, the method 300 proceeds to operation 322. The method 300 ends at operation 322.

In some embodiments, the actual runway length obtained from the navigation database 214 is used to perform the DDM to degree (or radian) conversion based upon the standard DDM/ft conversation at the runway threshold as specified by the ICAO (i.e., 0.00044 DDM/ft). In these embodiments, a small angle approximation is used and the DDM to degree scale factor is computed as follows:

$$\frac{57.3\left(\frac{\deg}{\text{rad}}\right)}{\left[\left(0.00044\left(\frac{DDM}{\text{ft}}\right)\right) * (\text{rwy\_len(ft)} + \text{assumed\_dist\_from\_far\_end\_of\_rwy\_to\_loc(ft)})\right]},$$

wherein rwy_len is the actual runway length as obtained from the navigation database 214 and assumed_dist_from_far_end_of_rwy_to_loc is the assumed distance from the far end of the destination runway 106 (i.e., the end of the destination runway 106 closest to the localizer transmitter 104) to the localizer transmitter 104.

Based on the foregoing, it should be appreciated that technologies for consistent localizer capture have been disclosed herein. Although the subject matter presented herein may have been described at times in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A method for guiding an aircraft during a final approach towards a runway, the method comprising:
    receiving a geographic position of the aircraft;
    receiving a geographic position of a runway threshold of the runway;
    receiving a runway azimuth of the runway;
    computing a distance from the aircraft to the runway threshold utilizing the geographic position of the aircraft and the geographic position of the runway threshold;
    computing a bearing to the geographic position of the runway threshold utilizing the geographic position of the aircraft and the geographic position of the runway threshold;
    projecting the distance from the geographic position of the aircraft to the geographic position of the runway threshold into an along runway component and a cross runway component utilizing the runway azimuth of the runway;
    determining a distance from the geographic position of the runway threshold to a geographic position of a localizer transmitter;
    computing a distance geographically along the runway from the geographic position of the aircraft to the geographic position of the localizer transmitter utilizing the distance from the geographic position of the runway threshold to the geographic position of the localizer transmitter;
    converting an angular localizer deviation into a rectilinear localizer deviation utilizing, in part, the distance along the runway from the geographic position of the aircraft to the geographic position of the localizer transmitter; and
    providing the rectilinear localizer deviation to a guidance system for guiding the aircraft during the final approach towards the runway.

2. The method of claim 1, further comprising receiving a runway length of the runway, and wherein:
    determining the distance from the runway threshold to the localizer transmitter comprises determining the distance from the runway threshold to the localizer transmitter as the runway length; and
    computing the distance from the aircraft to the localizer transmitter comprises computing the distance from the aircraft to the localizer transmitter by adding the distance from the runway threshold to the localizer transmitter to the along runway component of the projection of the distance from the aircraft to the runway threshold.

3. The method of claim 2, wherein the runway length comprises:
    a standard runway length that is not an actual runway length of the runway; or
    an actual runway length of the runway.

4. The method of claim 3, wherein computing the distance from the aircraft to the localizer transmitter is performed in accordance with the following equation:

dist_to_loc=dist_to_rwy_thd*cos(brg_to_thd−rwy_azmth)+dist_from_rwy_thd_to_loc, wherein dist_to_loc is the distance from the aircraft to the localizer transmitter in an along runway axis, dist_to_rwy_thd is the distance from the aircraft to the runway threshold, brg_to_thd is the bearing to the runway threshold, rwy_azmth is the runway azimuth, and dist_from_rwy_thd_to_loc is the runway length.

5. The method of claim 1, further comprising receiving a geographic position of the localizer transmitter, and wherein:
    determining the distance from the runway threshold to the localizer transmitter comprises computing the distance from the runway threshold to the geographic position of localizer transmitter; and
    computing the distance from the aircraft to the localizer transmitter comprises computing the distance from the aircraft to the localizer transmitter by adding the distance from the runway threshold to the localizer transmitter to the along runway component of the projection of the distance from the aircraft to the runway threshold.

6. The method of claim 5, wherein computing the distance from the aircraft to the localizer transmitter is performed in accordance with the following equation:

dist_to_loc=dist_to_rwy_thd*cos(brg_to_thd−rwy_azmth)+dist_from_rwy_thd_to_loc, wherein dist_to_loc is the distance from the aircraft to the localizer transmitter in an along runway axis, dist_to_rwy_thd is the distance from the aircraft to the runway threshold, brg_to_thd is the bearing to the runway threshold, rwy_azmth is the runway azimuth, and dist_from_rwy_thd_to_loc is the distance from the runway threshold to the localizer transmitter.

7. The method of claim 1, wherein providing the rectilinear localizer deviation to the guidance system comprises providing the rectilinear localizer deviation to an autopilot system of the aircraft, the autopilot system being configured to control the aircraft during the final approach to capture a localizer null of the localizer transmitter; and further comprising:

controlling, via the autopilot system, the aircraft during the final approach to capture the localizer null of the localizer transmitter.

8. The method of claim 1, wherein providing the rectilinear localizer deviation to the guidance system comprises providing the rectilinear localizer deviation to a flight director system of the aircraft, the flight director system of the aircraft being configured to provide control instructions to a pilot of the aircraft during the final approach to aid in a capture of a localizer null of the localizer transmitter; and further comprising:
providing, via the flight director system, the control instructions to the pilot of the aircraft during the final approach to aid in the capture of the localizer null of the localizer transmitter.

9. An avionics system of an aircraft for guiding the aircraft during a final approach towards a runway, the avionics system comprising:
an instrument landing system sensor configured to receive guidance signals from a localizer transmitter during the final approach of the aircraft towards the runway;
a navigation system comprising
a location component configured to acquire a geographic position of the aircraft,
a navigation database configured to store a geographic position of a runway threshold of the runway, a geographic position of a runway threshold of the runway, and
a runway azimuth of the runway, and
a flight management function configured to
receive the geographic position of the aircraft, the geographic position of a runway threshold of the runway, and the runway azimuth of the runway from the navigation database,
compute a distance from the geographic position of the aircraft to the geographic position of the runway threshold,
compute a bearing to the geographic position of the runway threshold utilizing the geographic position of the aircraft and the geographic position of the runway threshold,
project the distance from the geographic position of the aircraft to the geographic position of the runway threshold into an along runway component and a cross runway component utilizing the runway azimuth of the runway,
determine a distance from the geographic position of the runway threshold to a geographic position of a localizer transmitter,
compute a distance geographically along the runway from the geographic position of the aircraft to the geographic position of the localizer transmitter utilizing the distance from the geographic position of the runway threshold to the geographic position of the localizer transmitter, and
provide the distance from the geographic position of the aircraft to the geographic position of the localizer transmitter to a deviation calculator; and
the deviation calculator being configured to
convert an angular localizer deviation into a rectilinear localizer deviation utilizing, in part, the distance along the runway from the geographic position of the aircraft to the geographic position of the localizer transmitter, and
provide the rectilinear localizer deviation to a guidance system for guiding the aircraft during the final approach towards the runway.

10. The avionics system of claim 9, wherein the navigation database is further configured to store a runway length of the runway, and the flight management function is further configured to receive the runway length from the navigation database; and wherein:
the flight management function, in being configured to determine the distance from the runway threshold to the localizer transmitter, is configured to determine the distance from the runway threshold to the localizer transmitter as the runway length; and
the flight management function, in being configured to compute the distance from the aircraft to the localizer transmitter, is configured to compute the distance from the aircraft to the localizer transmitter by adding the distance from the runway threshold to the localizer transmitter to the along runway component of the projection of the distance from the aircraft to the runway threshold.

11. The avionics system of claim 10, wherein the runway length comprises:
a standard runway length that is not an actual runway length of the runway; or
an actual runway length of the runway.

12. The avionics system of claim 11, wherein the flight management function, in being configured to compute the distance from the aircraft to the localizer transmitter, is configured to compute the distance from the aircraft to the localizer transmitter in accordance with the following equation:

$$\text{dist\_to\_loc}=\text{dist\_to\_rwy\_thd}*\cos(\text{brg\_to\_thd}-\text{rwy\_azmth})+\text{dist\_from\_rwy\_thd\_to\_loc},$$

wherein dist_to_loc is the distance from the aircraft to the localizer transmitter in an along runway axis, dist_to_rwy_thd is the distance from the aircraft to the runway threshold, brg_to_thd is the bearing to the runway threshold, rwy_azmth is the runway azimuth, and dist_from_rwy_thd_to_loc is the runway length.

13. The avionics system of claim 9, wherein the navigation database is further configured to store a geographic position of the localizer transmitter, and the flight management function is further configured to receive the geographic position of the localizer transmitter from the navigation database; and wherein:
the flight management function, in being configured to determine the distance from the runway threshold to the localizer transmitter, is configured to compute the distance from the runway threshold to the geographic position of the localizer transmitter; and
the flight management function, in being configured to compute the distance from the aircraft to the localizer transmitter, is configured to compute the distance from the aircraft to the localizer transmitter by adding the distance from the runway threshold to the localizer transmitter to the along runway component of the projection of the distance from the aircraft to the runway threshold.

14. The avionics system of claim 13, wherein the flight management function, in being configured to compute the distance from the aircraft to the localizer transmitter, is configured to compute the distance from the aircraft to the localizer transmitter in accordance with the following equation:

$$\text{dist\_to\_loc}=\text{dist\_to\_rwy\_thd}*\cos(\text{brg\_to\_thd}-\text{rwy\_azmth})+\text{dist\_from\_rwy\_thd\_to\_loc},$$

wherein dist_to_loc is the distance from the aircraft to the localizer transmitter in an along runway axis, dist_to_rwy_thd is the distance from the aircraft to the runway threshold, brg_to_thd is the bearing to the runway threshold, rwy_azmth is the runway azimuth, and dist_from_rwy_thd_to_loc is the distance from the runway threshold to the localizer transmitter.

15. The avionics system of claim 9, further comprising the guidance system, the guidance system comprising an autopilot system; and wherein:
the deviation calculator, in being configured to provide the rectilinear deviation to the guidance system, is configured to provide the rectilinear deviation to the autopilot system; and
the autopilot system being configured to
receive the rectilinear localizer deviation from the deviation calculator, and
control the aircraft during the final approach to capture a localizer null of the localizer transmitter.

16. The avionics system of claim 9, further comprising the guidance system, the guidance system comprising a flight director system; and wherein:
the deviation calculator, in being configured to provide the rectilinear deviation to the guidance system, is configured to provide the rectilinear localizer deviation to the flight director system; and
the flight director system being configured to:
receive the rectilinear localizer deviation, and
provide control instructions to a pilot of the aircraft during the final approach to aid in capture of a localizer null of the localizer transmitter.

17. A physical computer storage device having computer readable instructions that, when executed by a computer of an aircraft, cause the computer to:
receive a geographic position of the aircraft;
receive a geographic position of a runway threshold of a runway;
receiving a runway length of the runway;
receive a runway azimuth of the runway;
compute a distance from the aircraft to the runway threshold utilizing the geographic position of the aircraft and the geographic position of the runway threshold;
compute a bearing to the geographic position of the runway threshold utilizing the geographic position of the aircraft and the geographic position of the runway threshold;
project the distance from the geographic position of the aircraft to the geographic position of the runway threshold into an along runway component and a cross runway component utilizing the runway azimuth of the runway;
compute a distance geographically along the runway from the geographic position of the aircraft to a geographic position of a localizer transmitter by adding the runway length to the along runway component of the projection of the distance from the geographic position of the aircraft to the geographic position of the runway threshold;
convert an angular localizer deviation into a rectilinear localizer deviation utilizing, in part, the distance along the runway from the geographic position of the aircraft to the geographic position of the localizer transmitter; and
output the rectilinear localizer deviation to a guidance system for guiding the aircraft during a final approach towards the runway.

18. The physical computer storage device of claim 17, wherein the runway length comprises:
a standard runway length that is not an actual runway length of the runway; or an actual runway length of the runway.

19. The physical computer storage device of claim 17, wherein the guidance system comprises:
an autopilot system; or
a flight director system.

20. The physical computer storage device of claim 17, wherein the instructions for computing the distance from the aircraft to the localizer transmitter comprise instructions for computing the distance from the aircraft to the localizer transmitter in accordance with the following equation:

$$\text{dist\_to\_loc} = \text{dist\_to\_rwy\_thd} * \cos(\text{brg\_to\_thd} - \text{rwy\_azmth}) + \text{rwy\_len},$$

wherein dist_to_loc is the distance from the aircraft to the localizer transmitter in an along runway axis, dist_to_rwy_thd is the distance from the aircraft to the runway threshold, brg_to_thd is the bearing to the runway threshold, rwy_azmth is the runway azimuth, and rwy_len is the runway length.

* * * * *